(12) United States Patent
Zhai et al.

(10) Patent No.: US 12,498,429 B2
(45) Date of Patent: Dec. 16, 2025

(54) COMMUTATOR ON-OFF DETECTION MECHANISM WITH SELF-CHECKING FUNCTION AND DETECTION METHOD THEREOF

(71) Applicant: Hangzhou Dianzi University, Hangzhou (CN)

(72) Inventors: Xin Zhai, Hangzhou (CN); Haidi Dong, Hangzhou (CN); Zhongmin Liu, Hangzhou (CN)

(73) Assignee: Hangzhou Dianzi University, Hangzhou (CN)

( * ) Notice: Subject to any disclaimer, the term of this patent is extended or adjusted under 35 U.S.C. 154(b) by 159 days.

(21) Appl. No.: 18/396,736

(22) Filed: Dec. 27, 2023

(65) Prior Publication Data

US 2024/0337704 A1 Oct. 10, 2024

(30) Foreign Application Priority Data

Apr. 7, 2023 (CN) .......................... 202310367081.8

(51) Int. Cl.
*G01R 31/54* (2020.01)
*G01R 1/04* (2006.01)
*G01R 31/52* (2020.01)

(52) U.S. Cl.
CPC ............... *G01R 31/54* (2020.01); *G01R 1/04* (2013.01); *G01R 31/52* (2020.01)

(58) Field of Classification Search
None
See application file for complete search history.

(56) References Cited

U.S. PATENT DOCUMENTS

| | | | | | |
|---|---|---|---|---|---|
| 5,576,585 | A | * | 11/1996 | Cardini ................. | H02K 23/30 310/51 |
| 6,617,743 | B1 | * | 9/2003 | Potocnik ................ | H01R 43/06 310/237 |
| 9,702,906 | B2 | * | 7/2017 | Cocchini ............ | G01R 1/06794 |
| 2011/0006717 | A1 | * | 1/2011 | Kyrtsos ..................... | H02P 7/06 318/490 |

FOREIGN PATENT DOCUMENTS

| CN | 102680864 A | * | 9/2012 | ............ G01R 31/12 |
|---|---|---|---|---|
| CN | 117811269 A | * | 4/2024 | ............ H02K 7/116 |
| CN | 118244163 B | * | 8/2024 | ............ B24B 49/02 |

* cited by examiner

*Primary Examiner* — Richard Isla
(74) *Attorney, Agent, or Firm* — Zhigang Ma

(57) ABSTRACT

A commutator on-off detection mechanism with a self-checking function and a detection method thereof are provided, the commutator on-off detection mechanism includes an upper detection module and a lower detection module disposed directly below the upper detection module, the upper detection module is provided with upper resilient sheets, the lower detection module is provided with lower resilient sheets, and numbers of the upper resilient sheets and lower resilient sheets are equal. The upper detection module is configured to press a commutator downwards until the commutator is snapped into the lower detection module, thereby to make the commutator be in contact with the lower resilient sheets of the lower detection module, and the upper detection module is further configured to make the upper resilient sheets be in contact with the commutator. The device has high detection efficiency, does not require frequent replacement of accessories, and there will be no leakage or wrong detection.

9 Claims, 4 Drawing Sheets

COMMUTATOR ON-OFF DETECTION MECHANISM WITH SELF-CHECKING FUNCTION AND DETECTION METHOD THEREOF

TECHNICAL FIELD

The disclosure relates to the technical field of commutator detection, and particularly to a commutator on-off detection mechanism with a self-checking function and a detection method thereof.

BACKGROUND

The structure and surface quality of the commutator have a very important influence on the performance of the motor. For example, the size and shape of the grooves between the copper bars of the commutator (e.g., the width, depth, and cross-sectional shape of the grooves) directly affects the noise of the motor, and the surface quality of the grooves (residual mica flakes, stains on the edges of the grooves, and burrs on the edges of the grooves) directly affects the insulating properties of the motor.

Currently, most of the insulation between the copper bars of the commutator and the insulation between the copper bars of the commutator and the mounting shaft are inspected manually or by inspection equipment without self-test function. Manual detection is inefficient and prone to misdetection and leakage. Most of the existing testing equipment on the market uses probe detection. Although the detection efficiency is improved compared to manual, but the probe is easy to bend in the detection process, and the probe needs to be replaced frequently. In addition, these testing equipment in the detection process does not have the equipment self-test function, for the unqualified test results, it is impossible to determine whether it is a product problem or a problem with the testing equipment itself.

SUMMARY

In order to solve the technical problems existing in the prior art mentioned above, the disclosure provides a commutator on-off detection mechanism with a self-checking function and a detection method thereof. The disclosure can carry out the self-test of the detection mechanism when the commutator is positioned before the on-off detection, and at the same time, it can detect defects such as missing or broken hooks in the bent hook portion of the commutator. The detection efficiency is high, and there is no need for frequent replacement of parts, and there will be no leakage or wrong detection.

The technical solution adopted by the disclosure to solve the above technical problems is as follows.

A commutator on-off detection mechanism with a self-checking function includes an upper detection module and a lower detection module, and the lower detection module is disposed directly below the upper detection module. The upper detection module is provided with upper resilient sheets, the lower detection module is provided with lower resilient sheets. Copper bars of the commutator-to-be-detected, the upper resilient sheets and lower resilient sheets are equal in number. The upper detection module is configured to press the commutator to be detected downwards until the commutator to be detected is snapped into the lower detection module, which makes the commutator to be detected be in contact with the lower resilient sheets of the lower detection module, and the upper detection module is further configured to make the upper resilient sheets be in contact with the commutator to be detected, Thereby, the upper resilient sheets of the upper detection module and the lower resilient sheets of the lower detection module are brought into contact with the copper bars of the commutator.

In an embodiment, the commutator on-off detection mechanism further includes a base plate, vertical plates disposed above the base plate, and an extended fixing block disposed above the vertical plates. The upper detection module includes a first cylinder fixed to the extended fixing block, and an output shaft of the first cylinder is connected to a first top rod. The first top rod is connected to a pin. Below the pin is a lower detection module. The pin serves to press the to-be-detected commutator downwardly, driven by the first cylinder, until the to-be-detected commutator snaps into the lower detection module.

In an embodiment, the commutator on-off detection mechanism further includes: vertical guide rails, sliding blocks, a sliding plate, a connecting plate, and a mounting seat. The vertical guide is mounted on the vertical plate. The sliding plate slides on the guide rail by means of the sliding block mounted thereon. The connection plate is connected to the sliding plate, and the mounting seat is connected to the sliding plate via the connection plate. The upper resilient sheets of the upper detection module is mounted on the mounting seat. The pin movably passes through the mounting seat.

In an embodiment, a rectangular installation area is formed on one side of the L-shaped mounting seat, and a convex pedestal is fixed to the rectangular installation area. The pin is configured to movably pass through the convex pedestal and the rectangular installation area. A circumferential surface of the convex pedestal is provided with long grooves evenly distributed, and each long groove is fixed with one of the bent upper resilient sheets.

In an embodiment, the sliding plate is provided with a second cylinder, and a movable end of the second cylinder is connected to the base plate.

In an embodiment, a buffer is disposed below the sliding plate, and the buffer is disposed on the base plate. The buffer serves as a limit on the one hand and reduces the speed of the commutator's downward movement on the other.

The upper resilient sheets of the upper detection module and the pin disposed at an end of the first cylinder need to be used in conjunction. After the commutator to be detected is placed in the lower detection module, the first cylinder can drive the pin to extend downwards and press the commutator downwards until the grooves of the commutator are matched with the limit stoppers of the lower detection module. Simultaneously, copper bars of the commutator is also in contact with the lower resilient sheets. After the contact, the pin is reset as the first cylinder retracts. The upper resilient sheets move downwards to the top of the commutator through the drive of the mounting seat, the sliding plate and the second cylinder, and the upper resilient sheets are in contact with the top of the copper bars of the commutator to achieve the self-checking of the detection mechanism. When the upper resilient sheets, the lower resilient sheets and the copper bars of the commutator are in a conductive state, the self-checking is succeeded, or when the upper resilient sheets, the lower resilient sheets and the copper bars of the commutator are not in a conductive state, the self-checking is failed. The step of the self-checking can preliminarily detect whether there is a problem with the commutator (such as a hook missing at the top of the commutator), and on the other hand, it can check whether the upper resilient sheets and the lower resilient sheets are worn or deformed. After the self-checking is succeeded, the on/off detection step can proceed.

In an embodiment, the lower detection module includes a mounting base, the mounting base is provided with grooves evenly distributed, and the grooves are respectively provided with the bent lower resilient sheets.

In an embodiment, the mounting base is provided with a positioning ring, and the positioning ring is provided with the limit stoppers symmetrical disposed.

When the commutator to be detected is placed in the positioning ring of the lower detection module, the groove of the commutator also needs to cooperate with the limit stop for accurate positioning. The commutator to be detected is in contact with the lower resilient sheets under the push of the pin of the upper detection module. After the self-checking, the commutator can undergo the on-off detection in the lower detection module. When no leakage current is detected between the copper bars of the commutator, the on-off detection is succeeded, or when leakage current is detected between the copper bars of the commutator, the on-off detection is failed.

In an embodiment, a second top rod is disposed below the mounting base, the second top rod passes through an installation plate to connect an output shaft of a motor, the motor is fixed to the installation plate, the installation plate is connected to guide columns, and the guide columns is movably extended into guide sleeves, and bottoms of the guide columns movably pass through a fixed frame, the fixed frame is disposed on the base plate. The guide sleeves are disposed on the fixed frame, the fixed frame is provided with a third cylinder, and an output shaft of the third cylinder is fixedly connected to the installation plate. The components disposed on the fixed frame are used for pushing out the commutator. After the detection is completed, the third cylinder pushes the guide columns and the second top rod to move upwards, and the second top rod extends into the mounting base to lift the detected commutator until the grooves of the commutator are higher than the limit stoppers. Then, the translation mechanism clamps the detected commutator to the next station.

In summary, the detection mechanism of the disclosure detects the commutator through the cooperation of the upper and lower detection module. The commutator to be detected is placed in the lower detection module, and the copper bars of the commutator need to be in contact with the lower resilient sheets. Furthermore, the upper detection module move towards the commutator placed in the lower detection module until the upper resilient sheets of the upper detection module are in contact with the copper bars of the commutator, after the contact, a controller sends a detection command to conduct a conductivity of the self-checking between the commutator, the upper resilient sheets and the lower resilient sheets. After detecting that each copper bar of the commutator is conducted to the upper resilient sheet and the lower resilient sheet, it is deemed that the self-checking of the commutator is succeeded. When one of the copper bars is not conducted to the upper resilient sheet and the lower resilient sheet, it is deemed that the commutator is unqualified or the resilient sheets are damaged. The commutator that passes the self-checking can undergo the on/off detection in the lower detection module, and after the two detection processes are succeed, it is deemed that the commutator is a qualified commutator, and the qualified commutator is transported to a next program.

The disclosure further provides a detection method based on the commutator on-off detection mechanism with the self-checking function, including the following steps:

1) loading: a commutator is conveyed through an external feeding mechanism, and the conveyed commutator is lifted through cylinders, and is waited for a translation station to clamp and transport;

2) feeding: the commutator lifted by the cylinder in an external direct vibration mechanism is grabbed by a pneumatic gripper in the translation station, and after being clamped, the commutator is driven to a side by cylinder and sliding blocks, the commutator to be detected is placed in the lower detection module of the commutator on-off detection mechanism for positioning;

3) self-checking: the commutator to be detected is placed in the positioning ring of the lower detection module, grooves of the commutator to be detected are matched with the limit stoppers of the positioning ring for positioning, the pin is driven to move downwards by the first cylinder of the upper detection module, and the commutator to be detected is pushed downwards, thereby contacting lower edges of copper bars on an outer ring of the commutator to be detected with the lower resilient sheets disposed on the mounting base, the upper resilient sheets of the upper detection module are driven to move downwards by a cooperation of the mounting seat, the sliding plate and the first cylinder until the upper resilient sheets of the upper detection module contact upper edges of the copper bars on the outer ring of the commutator, after the contact, the upper resilient sheets and the lower resilient sheets are conducted with the copper bars of the commutator to self-checking. When the contact between the upper resilient sheets, the lower resilient sheets and the commutator is not in a conductive state, the self-checking is failed, failure of the self-checking is divided into failure of the self-checking of a single commutator and failure of the self-checking of continuous multiple commutators. When the self-checking of a single commutator is unqualified, the commutator is removed by clamping and placing to a waste removal station. When the self-checking of continuous multiple commutators is unqualified, it is necessary to check for device failures and whether there are problems with the upper resilient sheets and the lower resilient sheets;

4) on/off detection: after the self-checking is succeeded, and the upper detection module is reset through the guide rails and the sliding blocks. The lower resilient sheets of the lower detection module are in contact with the copper bars of the commutator for the on/off detection. When no leakage current is detected between contact segments of the commutator, the on/off detection is succeeded, or when leakage current is detected between the contact segments of the commutator, the on/off detection is failed;

5) discharging and feeding: after the detection is completed, the commutator is lifted up by the push rod driven by the third cylinder of the lower detection module, and then the commutator is conveyed to an unloading station by the translation station, when the self-checking or the on-off detection of the commutator is unqualified, the commutator is conveyed to the waste removal station.

Compared with the prior art, the beneficial technical effects of the disclosure are as follows.

The disclosure performs the self-checking and the on/off detection of the commutator through the cooperation of the upper and lower detection module. The bent upper resilient sheets and the bent lower resilient sheets of the upper and lower detection modules are in contact with the upper and lower edges of the copper bars of the commutator to perform self-checking to detect whether the commutator is initially qualified and whether the upper resilient sheets and the lower resilient sheets are worn or damaged, the self-checking step can be carried out simultaneously with the upper detection module pressing the commutator to the lower detection module and the lower detection module positioning the commutator, after the self-checking is succeeded, the on/off detection of the commutator is carried out by the lower detection module. The two-step detection further ensures the quality of the commutator and is not prone to missed or false detections. Simultaneously, the detection technology adopted by the disclosure has stronger stability and durability compared to existing manual and probe detection methods, and can also be guaranteed in terms of detection efficiency, without the need for frequent replacement of accessories.

In attached drawings, description of reference signs is listed as follows:
1. body frame; 2. translation station; 3. on/off detection station; 4. waste removal station; 5. unloading station; 11. ⊥-shaped base plate; 12. buffer; 13. vertical plate; 14. guide rail; 15. sliding block; 16. sliding plate; 17. connecting plate; 18. extended fixing block; 19. cylinder; 21. mounting seat; 22. fixed frame; 23. cylinder; 24. motor; 25. top rod; 26. guide sleeve; 27. guide column; 28. installation plate; 31. upper detection module; 301. cylinder; 302. top rod; 303. pin; 304. convex pedestal; 305. upper resilient sheet; 32. lower detection module; 311. mounting base; 312. positioning ring; 313. lower resilient sheet; 314. limit stopper.

DETAILED DESCRIPTION OF EMBODIMENTS

The disclosure will be further described in conjunction with specific embodiments, but the scope of protection of the disclosure is not limited to this.

Figure 1:
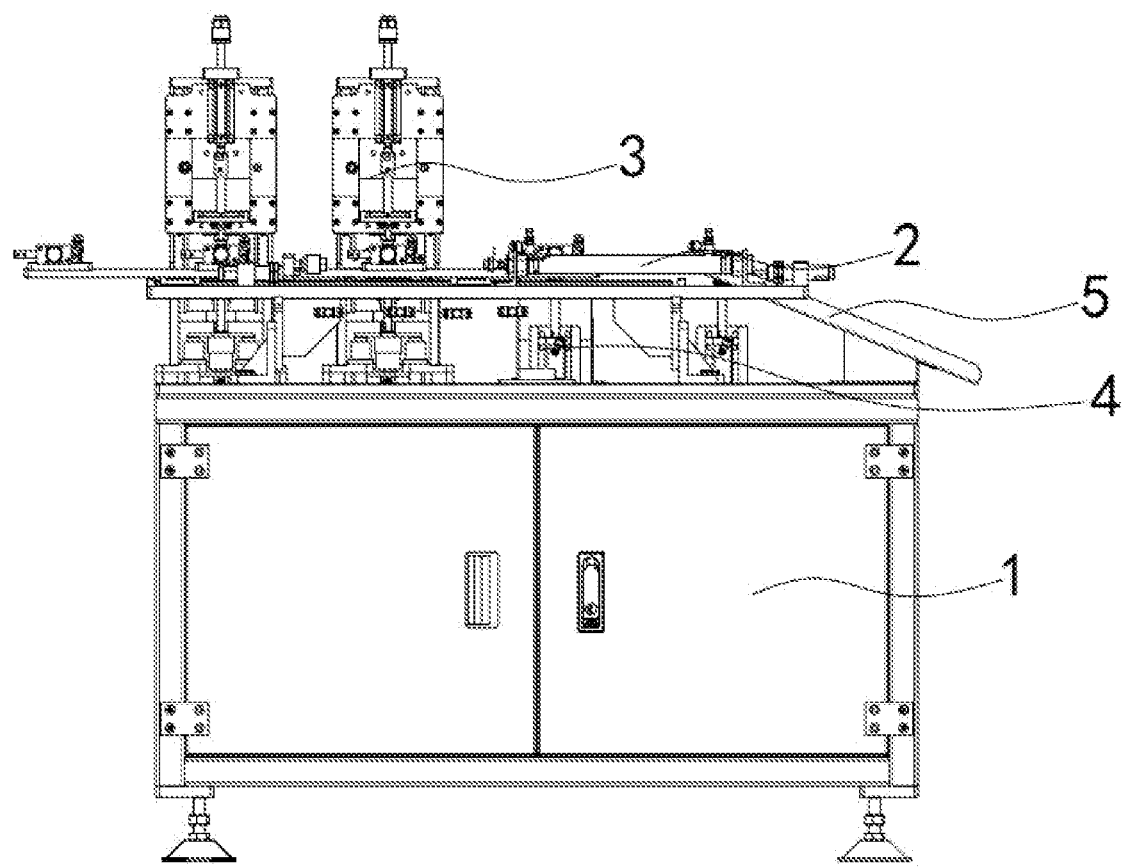
FIG. 1 illustrates a structural schematic diagram of a commutator detection device of the disclosure.
Figure 2:
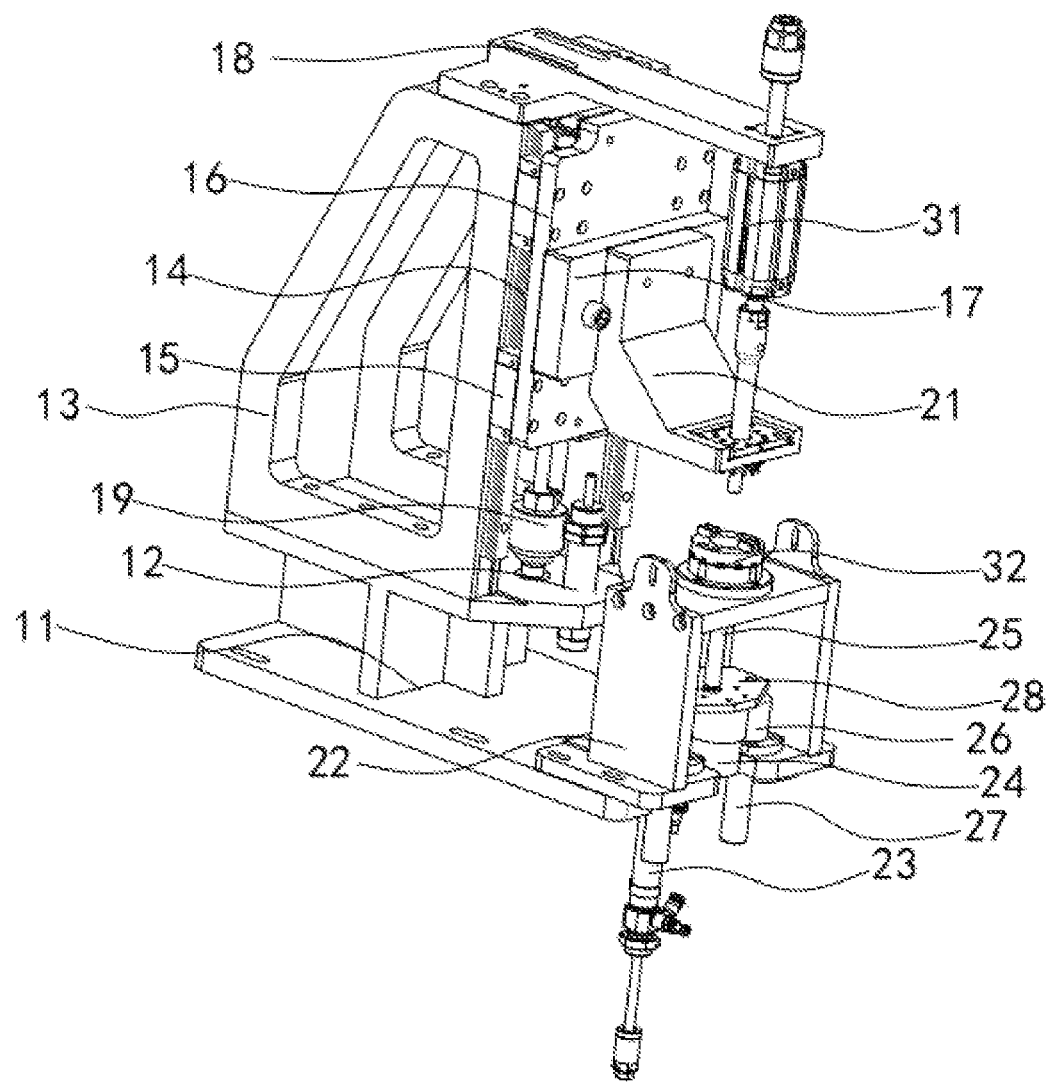
FIG. 2 illustrates a structural schematic diagram of a commutator on-off detection mechanism with a self-checking function of the disclosure.
Figure 3:
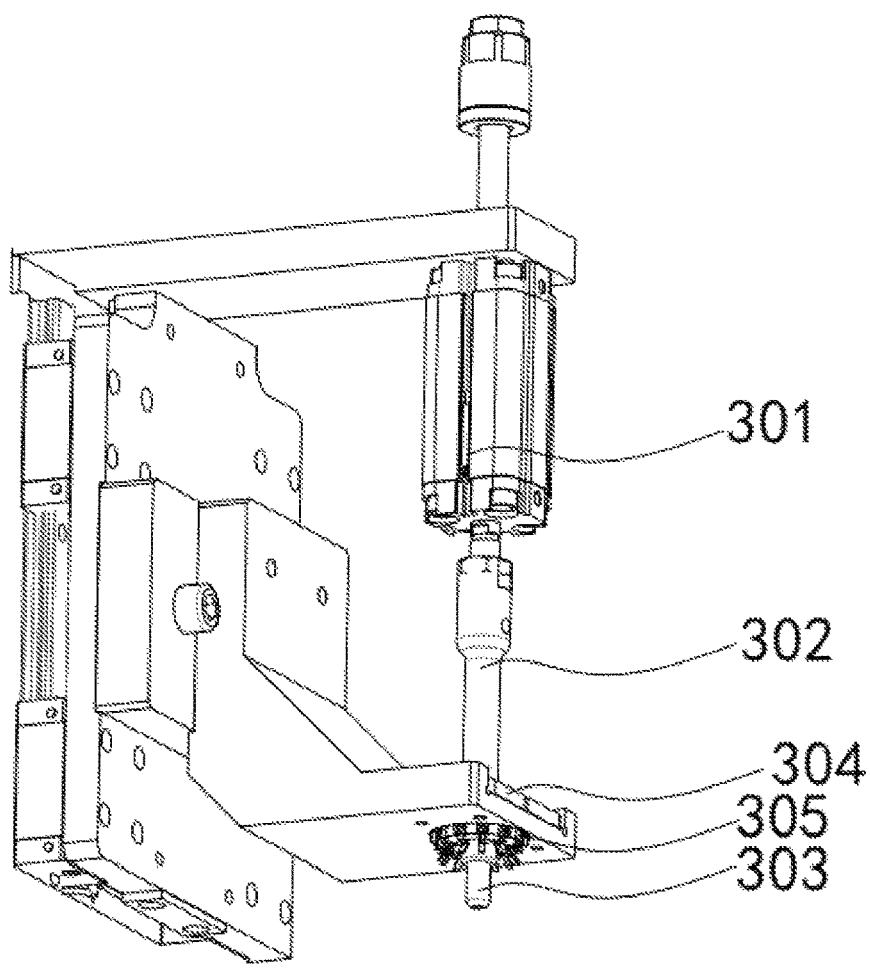
FIG. 3 illustrates a structural schematic diagram of an upper detection module of the disclosure.
Figure 4:
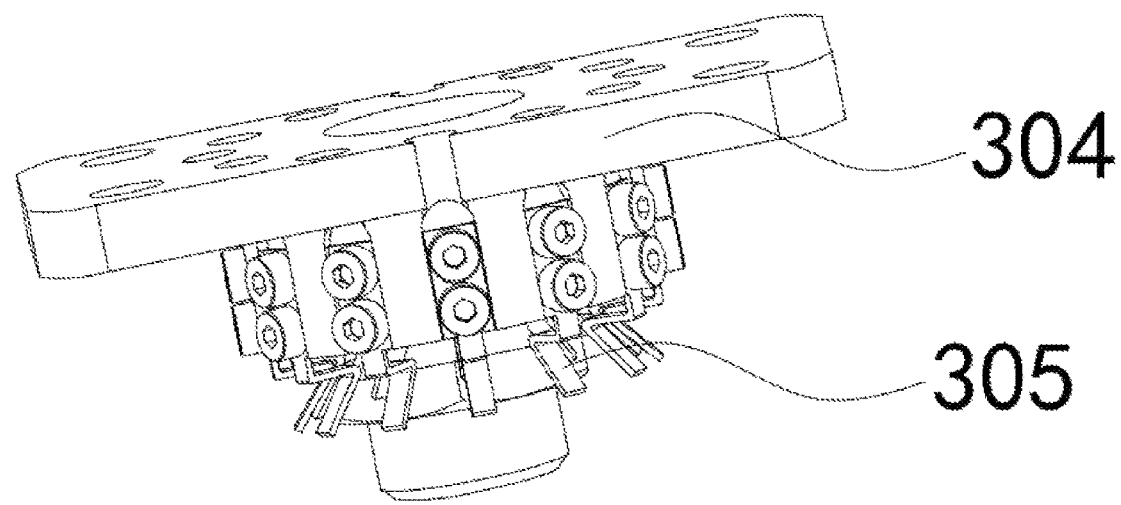
FIG. 4 illustrates a schematic structural diagram of a cooperation between a convex pedestal and upper resilient sheets of the disclosure.
Figure 5:
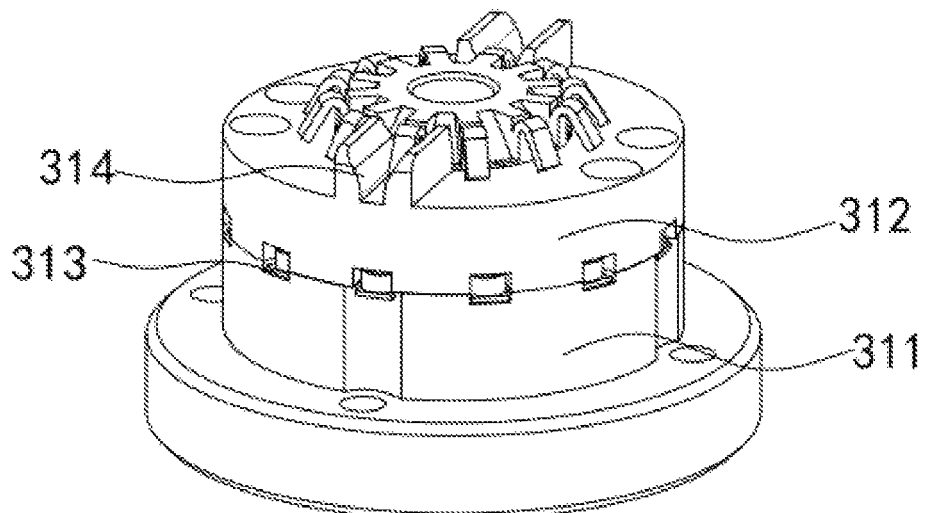
FIG. 5 illustrates a structural schematic diagram of a lower detection module of the disclosure.
Figure 6:
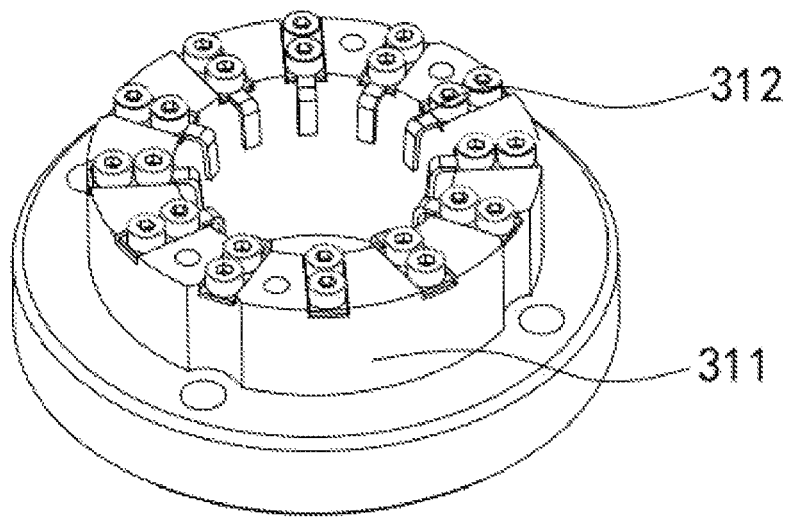
FIG. 6 illustrates a structural schematic diagram of the lower detection module without a positioning ring of the disclosure.

A commutator on-off detection mechanism with a self-checking function is disposed in a commutator detection device as shown in FIG. 1, the commutator detection device includes a body frame 1, an upper part of the body frame 1 is provided with on/off detection stations 3, waste removal station 4, and unloading station 5 from left to right. Multiple on/off detection stations 3 can be disposed as needed, and in this embodiment, two on/off detection stations 3 are disposed. The front of the on/off detection stations 3, the waste removal station 4, and the unloading station 5 is provided with a translation station 2 that is matched with the above stations, and the translation station 2 is used to move the commutator to the corresponding station. The body frame 1, the translation station 2, the waste removal station 4, and the unloading station 5 involved in the disclosure all are adopted the prior art.

Each on/off detection station 3 is provided with a commutator on-off detection mechanism with a self-checking function as shown in FIGS. 2 to 6, the commutator on-off detection mechanism with a self-checking function includes a ⊥-shaped base plate 11 and two vertical plates 13 disposed on the ⊥-shaped base plate 11, the two vertical plates 13 are vertically parallel and symmetrically disposed. An upper detection module 31 is disposed at front sides of the two vertical plates 13, and a lower detection module 32 is disposed directly below the upper detection module 31. The lower detection module 32 is disposed on a top of a fixed frame 22, and a bottom of the fixed frame 22 is fixedly disposed above the ⊥-shaped base plate 11. The detection mechanism detects the commutator through the cooperation of the upper detection module 31 and the lower detection module 32. The commutator to be detected is placed in the lower detection module 32, and copper bars of the commutator need to be in contact with the lower resilient sheets 313. In addition, the upper detection module 31 can move towards a direction of the commutator placed in the lower detection module 32 until the upper resilient sheets 305 of the upper detection module are in contact with the copper bars of the commutator. After the contact, a controller sends a detection command to conduct a conductivity of self-checking among the commutator and the upper resilient sheets 305 and the lower resilient sheets 313. After detecting that each copper bar of the commutator is conducted to the upper resilient sheet 305 and the lower resilient sheet 313, it is deemed that the commutator has passed the self-checking. When one of the copper bars is not conducted to the upper resilient sheet and the lower resilient sheet, it is deemed that the commutator is unqualified or the resilient sheets are damaged. The commutator that passes the self-checking can undergo the on/off detection in the lower detection module, and after the two detection processes are succeed, it is deemed that the commutator is a qualified commutator, and the qualified commutator is transported to a next program. The disclosure relates to the controller using the prior art.

Front ends surface of the two vertical plates 13 are provided with two vertical guide rails 14, and the two guide rails 14 are symmetrically disposed. Top surfaces of the two vertical plates 13 are connected to an extended fixing block 18, the extended fixing block 18 exceeds a front side of a vertical panel where the two guide rails 14 are disposed. The two guide rails 14 are provided with two sliding blocks 15 that can slide up and down. The two sliding blocks 15 are fixedly connected to a sliding plate 16, and a connecting plate 17 is disposed on a front of the sliding plate 16. A middle of the connecting plate 17 is connected to an L-shaped mounting seat 21, and a rectangular installation area of the L-shaped mounting seat 21 is assembled with the upper detection module 31. The above component combination is used to drive the upper detection module to slide in an upward and downward direction, that is to slide vertically.

An opposite side of the sliding plate 16 is fixedly disposed with a cylinder 19, and an movable end of the cylinder 19 is fixedly connected to the ⊥-shaped base plate 11. A buffer 12 is directly disposed below the sliding plate 16, and the buffer 12 is also disposed on the ⊤-shaped base plate 11. The sliding plate 16 is driven by the cylinder 19, and the movable end of the cylinder 19 extends downwards to drive the sliding plate 16 and various components disposed on the sliding plate 16 to move vertically. The purpose of setting the buffer 12 is, on the one hand, to limit the position, and on the other hand, to reduce the speed of downward movement of the commutator.

The upper detection module 31 includes a cylinder 301, an end of the cylinder 301 is fixed to the extended fixing block 18, and an output shaft of the cylinder 301 is connected to a top rod 302, a movable end of the top rod 302 is connected to a pin 303, and the pin 303 moves through a convex pedestal 304 and a lower end of the pin 303 is directly facing the lower detection module 32. A circumferential surface of the convex pedestal 304 is provided with long grooves evenly distributed, an interior of each long groove is fixed with the bent upper resilient sheet 305, and the convex pedestal 304 is fixed to the rectangular installation area of the mounting seat 21. The upper resilient sheets 305 disposed on the upper detection module 31 and the pin 303 at the end of the cylinder 301 need to be used together. After the commutator to be detected is placed in the lower detection module 32, the cylinder 301 starts to drive the pin 303 to extend downwards and press the commutator downwards until the grooves of the commutator are matched with the limit stoppers 314 of the lower detection module 32. Simultaneously, a bottom of the commutator can also be in contact with the lower resilient sheets 313. After the contact, the pin 303 is reset as the cylinder retracts 301. The upper resilient sheets 305 move downwards to the top of the commutator through the drive of the mounting seat 21, the sliding plate 16 and the cylinder 19, and the upper resilient sheets 305 are in contact with the top of the commutator to achieve the self-checking of the commutator. When the upper resilient sheets 305, the lower resilient sheets 313 and the commutator are in a conductive state, the self-checking is succeeded, or when the upper resilient sheets 305, the lower resilient sheets 313 and the commutator is not in a conductive state, the self-checking is failed. The step of the self-checking can preliminarily detect whether there is a problem with the commutator (such as a hook missing at the top of the commutator), and on the other hand, it can check whether the upper resilient sheets 305 and the lower resilient sheets 313 are worn or deformed. After the self-checking is succeeded, the on/off detection step can proceed.

The lower detection module 32 includes a mounting base 311, a top of the mounting base 311 is provided with grooves evenly distributed, and interiors of the grooves are respectively provided with the bent lower resilient sheets 313. Numbers of the copper bars, the upper resilient sheets 305 and lower resilient sheets 313 are equal. The mounting base 311 is provided with a positioning ring 312, and the positioning ring 312 is provided with limit stoppers 314 symmetrical disposed. When the commutator to be detected is placed in the positioning ring 312 of the lower detection module 32, the grooves of the commutator also need to be matched with the limit stoppers 314 to play an accurate positioning role. The commutator to be detected is in contact with the lower resilient sheets 313 under the push of the pin 303 of the upper detection module 31. After the self-checking, the commutator can undergo the on-off detection in the lower detection module 32. When no leakage current is detected between contact segments of the commutator, the on-off detection is succeeded, or when leakage current is detected between the contact segments of the commutator, the on-off detection is failed.

A middle lower part of the mounting base 311 is correspondingly provided with a top rod 25, the top rod 25 is connected to an output shaft of a motor 24 and passes through the installation plate 28 to be connected to the output shaft of the motor 24. The motor 24 is fixedly connected to the installation plate 28, and movable ends of two guide columns 27 are symmetrically connected on a left side and a right side of the installation plate 28. The guide columns 27 are vertically and movably inserted into inner parts of the guide sleeves 26, and the bottoms of the guide columns 27 pass through the bottom of the fixed frame 22, and the fixed frame 22 is disposed on the base plate 11. The bottoms of the guide sleeves 26 are fixedly disposed on the fixed frame 22, and a lower side of the fixed frame 22 is provided with a cylinder 23. A movable end of the cylinder 23 is connected to the installation plate 28. The components disposed on the fixed frame 22 are used for pushing out the commutator. After the detection is completed, the cylinder 23 pushes the guide columns 27 and the top rod 25 to move upwards, and the top rod 25 extends into the mounting base 311 to lift the detected commutator until the grooves of the commutator are higher than the limit stoppers 314. Then, the translation mechanism clamps the detected commutator to the next station. In this embodiment, the function of the motor 24 is to fine tune the placement position of the commutator. When the position of the commutator in the lower detection module 32 needs to be adjusted, the cylinder 23 can drive the top rod 25 to move up. After the top rod 25 is inserted into the inner hole of the commutator, the motor 24 drives the top rod 25 to rotate to fine tune the position of the commutator, so that the hook grooves of the commutator can be accurately fixed between the limit stopper 314.

A detection method of the commutator on-off detection mechanism with the self-checking function includes the following steps.

1) loading: the commutator to be detected is conveyed by an external direct vibration mechanism, and the conveyed commutator is lifted through cylinders, and is waited for the translation station to clamp and transport.
2) feeding: the commutator lifted by the cylinders in the external direct vibration mechanism is grabbed by a pneumatic gripper in the translation station, and after being clamped, the commutator to be detected is driven to a side by the cylinder and sliding blocks, the commutator to be detected is placed in the lower detection module of the commutator on-off detection mechanism for positioning.
3) self-checking: the commutator to be detected is placed in the positioning ring of the lower detection module, grooves of the commutator to be detected are matched with the limit stoppers of the positioning ring for positioning, the pin is driven to move downwards by the cylinder 301 of the upper detection module, and the commutator to be detected is pushed downwards, thereby contacting lower edges of copper bars on an outer ring of the commutator to be detected with the lower resilient sheets disposed on the mounting base. The upper resilient sheets of the upper detection module are driven to move downwards by a cooperation of the mounting seat, the sliding plate and the cylinder 19 until the upper resilient sheets of the upper detection module contact the upper edges of the copper bars on the outer ring of the commutator, after the contact, the upper resilient sheets and lower resilient sheets are conducted with the copper bars of the commutator to self-checking. When the contact between the upper resilient sheets, the lower resilient sheets and the commutator is not in a conductive state, the self-checking is failed, failure of the self-checking is divided into failure of the self-checking of a single commutator and failure of the self-checking of continuous multiple commutators. When the self-checking of a single commutator is unqualified, the commutator is removed by clamping and placing to the waste removal station. When the self-checking of the continuous multiple commutators is unqualified, it is necessary to check for device failures and whether there are problems with the upper resilient sheets and the lower resilient sheets.

4) on/off detection: after the self-checking is succeeded, and the upper detection module is reset through the guide rails and the sliding blocks. The lower resilient sheets of the lower detection module are in contact with the copper bars of the commutator for the on/off detection. When no leakage current is detected between contact segments of the commutator, the detection is succeeded, when leakage current is detected between the contact segments of the commutator, the detection is failed.

5) discharging and feeding: after the detection is completed, the top rod is driven to insert into the commutator by the cylinder 23 of the lower detection module, and the commutator is lift, then the commutator is conveyed to the unloading station by the translation station, when the self-checking or the on-off detection of the commutator is unqualified, the commutator is conveyed to the waste removal station.

The specific working principle of the commutator on-off detection mechanism with the self-checking function in this embodiment is as follows: in the disclosure, the on/off detection station 3, the translation station 2, the waste removal station 4, and the unloading station 5 constitute the entire device. The translation station 2 clamps the commutator into the on/off detection station 3. Specifically, the commutator to be detected is placed into the positioning ring 312 of the lower detection module 32, grooves of the commutator to be detected are matched with the limit stoppers 314 of the positioning ring 312 for positioning. At this time, the pin 303 is driven to extend downwards by the cylinder 301 of the upper detection module 31, the commutator is pushed downwards until the grooves of the commutator are matched with the limit stoppers 314 of the lower detection module 32. Simultaneously, the bottom of the commutator can also be in contact with the lower resilient sheets 313, and after the contact, the pin 303 can be reset as the cylinder 301 retracts. The upper resilient sheets 305 move downwards to the top of the commutator through the drive of the mounting seat 21, the sliding plate 16 and the cylinder 19, and the upper resilient sheets 305 are in contact with the top of the commutator to achieve the self-checking of the commutator. When the upper resilient sheets 305, the lower resilient sheets 313 and the commutator are in a conductive state, the self-checking is succeeded, or when the upper resilient sheets 305, the lower resilient sheets 315 and the commutator are not in a conductive state, the self-checking is failed. The commutator that is unqualified is clamped from the translation station 2 to the waste removal station 4, the commutator that passes the self-checking continues to be left in the lower detection module 32 for the on/off detection. The upper resilient sheets 305 in the upper detection module 31 are reset through the guide rails 14 and the sliding blocks 15, the lower resilient sheets 313 of the lower detection module 32 are in contact with the copper bars of the commutator for the on/off detection. When no leakage current is detected between contact segments of the commutator, the on/off detection is succeeded, or when leakage current is detected between the contact segments of the commutator, the on/off detection is failed. The commutator that has passes the self-checking and the on/off detection is gripped by the translation station 2 and stacked in the unloading station 5. The commutator that is unqualified enters the waste removal station 4.

The above translation station 2, waste removal station 4, and unloading station 5 are in the prior art.

The disclosure relates to a commutator on-off detection mechanism with a self-checking function, which can perform self-checking while positioning the commutator, and can detect defects such as missing or broken hooks in the bending part of the commutator. The detection efficiency is high, and there is no need to frequently replace accessories. It is not prone to miss or incorrect check.

The above provides a detailed explanation of the embodiments of the disclosure. For those skilled in the art, there may be changes in the specific implementation methods based on the ideas provided by the disclosure, and these changes should also be considered as the scope of protection of the disclosure.

What is claimed is:

1. A commutator on-off detection mechanism with a self-checking function, comprising: an upper detection module (31), a lower detection module (32), a base plate (11), vertical plates (13) disposed above the base plate (11), and an extended fixing block (18) disposed above the vertical plates (13);

wherein the lower detection module (32) is disposed directly below the upper detection module (31), the upper detection module (31) is provided with upper resilient sheets (305), the lower detection module (32) is provided with lower resilient sheets (313), and numbers of the upper resilient sheets (305) and the lower resilient sheets (313) are equal;

wherein the upper detection module (31) comprises:
a first cylinder (301), fixed to the extended fixing block (18);
a first top rod (302), connected to an output shaft of the first cylinder (301); and
a pin (303), connected to the first top rod (302); wherein a lower side of the pin (303) is directly facing the lower detection module (32); and the pin (303) is configured to press, under a drive of the first cylinder (301), the commutator to be detected downwards until the commutator to be detected is snapped into the lower detection module (32); and wherein the upper detection module (31) is configured to press a commutator to be detected downwards until the commutator to be detected is snapped into the lower detection module (32), thereby to make copper bars of the commutator to be detected be in contact with the lower resilient sheets (313) of the lower detection module (32); and the upper detection module (31) is further configured to make the upper resilient sheets (305) be in contact with the copper bars of the commutator to be detected.

2. The commutator on-off detection mechanism with the self-checking function as claimed in claim 1, wherein the commutator on-off detection mechanism further comprises:
vertical guide rails (14), disposed on the vertical plates (13);

sliding blocks (15), sliding cooperative with the guide rails (14);

a sliding plate (16), connected to the sliding blocks (15);

a connecting plate (17), connected to the sliding plate (16); and an mounting seat (21), connected to the sliding plate (16) through the connecting plate (17); wherein the mounting seat (21) is provided with the upper resilient sheets (305) of the upper detection module (31); and the pin (303) is configured to movably pass through the mounting seat (21).

3. The commutator on-off detection mechanism with the self-checking function as claimed in claim 2, wherein the mounting seat (21) is in a L shape, a side of the mounting seat (21) forms a rectangular installation area, and the rectangular installation area is fixed to a convex pedestal (304); the pin (303) is configured to movably pass through the convex pedestal (304) and the rectangular installation area; and a circumferential surface of the convex pedestal (304) is provided with long grooves evenly distributed, and each long groove is fixed with one of the bent upper resilient sheets (305).

4. The commutator on-off detection mechanism with the self-checking function as claimed in claim 3, wherein the sliding plate (16) is provided with a second cylinder (19), and a movable end of the second cylinder (19) is connected to the base plate (11).

5. The commutator on-off detection mechanism with the self-checking function as claimed in claim 4, wherein a buffer (12) is disposed below the sliding plate (16), and the buffer (12) is disposed on the base plate (11).

6. The commutator on-off detection mechanism with the self-checking function as claimed in claim 5, wherein the lower detection module (32) comprises: a mounting base (311), the mounting base (311) is provided with grooves evenly distributed, and the grooves are respectively provided with the bent lower resilient sheets (313).

7. The commutator on-off detection mechanism with the self-checking function as claimed in claim 6, wherein the mounting base (311) is provided with a positioning ring (312), and the positioning ring (312) is provided with limit stoppers (314) symmetrical disposed.

8. The commutator on-off detection mechanism with the self-checking function as claimed in claim 7, wherein a second top rod (25) is disposed below the mounting base (311), the second top rod (25) passes through an installation plate (28) to connect an output shaft of a motor (24), the motor (24) is fixed to the installation plate (28), the installation plate (28) is connected to guide columns (27), the guide columns (27) are movably extended into guide sleeves (26), bottoms of the guide columns (27) movably pass through a fixed frame (22), the fixed frame (22) is disposed on the base plate (11), the guide sleeves (26) are disposed on the fixed frame (22), the fixed frame (22) is provided with a third cylinder (23), and an output shaft of the third cylinder (23) is fixedly connected to the installation plate (28).

9. A detection method based on the commutator on-off detection mechanism with the self-checking function as claimed in claim 8, comprising the following steps:

1) loading: conveying the commutator to be detected and waiting a translation station to clamp the commutator to be detected;

2) feeding: translating the commutator to be detected to a side after the clamping, and placing the commutator to be detected in the lower detection module of the commutator on-off detection mechanism for positioning;

3) self-checking: placing the commutator to be detected in the positioning ring of the lower detection module, matching grooves of the commutator to be detected with the limit stoppers of the positioning ring for positioning, driving the pin to move downwards by the first cylinder of the upper detection module, and pushing the commutator to be detected downwards, thereby contacting lower edges of copper bars on an outer ring of the commutator to be detected with the lower resilient sheets disposed on the mounting base; simultaneously, driving the upper resilient sheets of the upper detection module to move downwards by cooperations of the mounting seat, the sliding plate and the first cylinder until the upper resilient sheets of the upper detection module contact upper edges of the copper bars on the outer ring of the commutator to be detected, after the contact, conducting the upper resilient sheets and the lower resilient sheets with the copper bars of the commutator to be detected to self-check;

4) on/off detection: resetting the upper detection module, and contacting the lower resilient sheets of the lower detection module with the copper bars of the commutator for the on/off detection;

5) discharging and feeding: driving the second top rod to insert into the commutator by the third cylinder of the lower detection module and lifting the commutator, then sending the commutator to an unloading station by the translation station; wherein when the self-checking or the on-off detection of the commutator is failed, the commutator is conveyed to a waste removal station.

\* \* \* \* \*